United States Patent [19]

Imazeki et al.

[11] 4,411,020

[45] Oct. 18, 1983

[54] POWER EFFICIENT RADIO RECEIVER APPARATUS

[75] Inventors: Kazuyoshi Imazeki; Nakano Masao, both of Tokyo, Japan

[73] Assignee: General Research of Electronics, Inc., Tokyo, Japan

[21] Appl. No.: 243,440

[22] Filed: Mar. 13, 1981

[51] Int. Cl.³ .............................................. H04B 1/10
[52] U.S. Cl. ................................... 455/219; 455/222; 455/225; 455/343
[58] Field of Search ............................... 455/218–220, 455/222, 343, 221, 225

[56] References Cited

U.S. PATENT DOCUMENTS

| | | | |
|---|---|---|---|
| 2,056,852 | 10/1936 | Hayden | 455/343 |
| 2,844,714 | 7/1958 | Cardon et al. | 455/343 |
| 3,320,492 | 5/1967 | Knochenhauer et al. | 455/218 |
| 3,569,840 | 3/1971 | Tanaka et al. | 455/343 |
| 3,852,671 | 12/1974 | Risley | 455/222 |

Primary Examiner—Marc E. Bookbinder
Attorney, Agent, or Firm—Trexler, Bushnell & Wolters, Ltd.

[57] ABSTRACT

An improvement in a radio receiver having a power supply and an audio amplifier circuit comprises a switching circuit interposed between the power supply and the audio amplifier circuit and including a control input responsive to a signal of predetermined level for substantially cutting off the audio amplifier circuit means from said power supply. In accordance with one aspect of the invention, this control input may be coupled to a squelch circuit. In accordance with another aspect of the invention, this control input may also be coupled to an AGC circuit.

13 Claims, 1 Drawing Figure

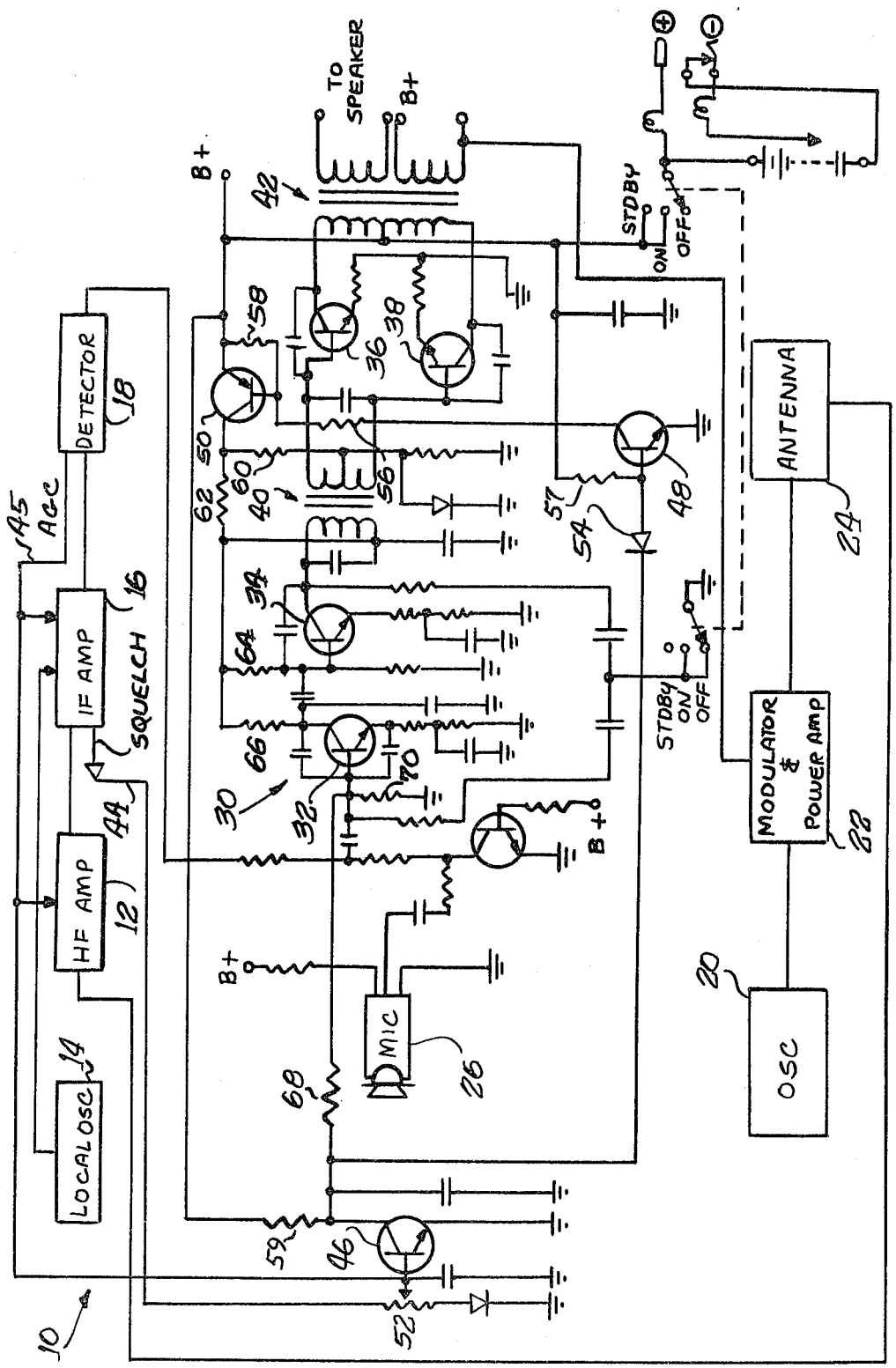

POWER EFFICIENT RADIO RECEIVER APPARATUS

BACKGROUND OF THE INVENTION

This invention relates generally to radio receivers and, more particularly to an improvement in a portable radio transceiver which significantly lowers the power consumption thereof.

In portable radio receivers and/or transceiver, a battery is generally utilized as the power supply. Accordingly, it is desirable to utilize a circuit construction which minimizes the power consumption where possible, in order to lengthen the service life of the battery.

Conventional radio receivers or transceivers generally include a squelch circuit for feeding the received audio signal to the audio amplifier system only when an audio signal sufficiently above the background noise level is present in the incoming radio signal. However, conventional audio amplifiers and preamplifiers generally draw a considerable amount of power even when no audio signal is being amplified, without regard for the action of the squelch circuit. For example, in a typical class B push-pull amplifier it is necessary to apply an idling current of about 5 to 10 mA in order to prevent crossover distortion even when no audio signal is present. Additionally, typical preamplifier circuits generally draw between 5 to 7 mA when no audio signal is present.

The provision of a squelch circuit prevents noise from being amplified and reproduced at the speakers of the receiver by detecting the level of noise present in the absence of an incoming radio signal and cutting off the inputs to the audio preamplifier and amplifier system when this noise exceeds a preselected level. However, this cutting off of the audio signal has little effect upon the power consumption of the audio amplifier circuits due to the idling current supplied to these circuits as mentioned above. Consequently, conventional radio receivers and transceivers exhibit significant power consumption even when no audio output is being produced. In a portable, battery powered unit, this amount of power consumption is undesirable in that it is deleterious to the batteries.

OBJECTS AND SUMMARY OF THE INVENTION

Accordingly, it is a general object of the invention to provide a radio receiver or transceiver with significantly lowered power consumption compared with prior art units of this type.

A more specific object is to provide an improved radio receiver or transceiver constructed so as to substantially cut off the power supply from the audio amplifier system when the audio signal present on the incoming radio waves is insufficient to warrant amplification and reproduction thereof.

Briefly, and in accordance with the foregoing objects, the present invention comprises an improvement in a radio receiver having a power supply and audio amplifier circuit means comprising a switching circuit means interposed between said power supply and said audio amplifier circuit means and including a control input responsive to a signal of predetermined level for substantially cutting off said audio amplifier circuit means from said power supply. In accordance with one aspect of the invention, this control input may be coupled to a squelch circuit. In accordance with another aspect of the invention, this control input may also be coupled to an AGC circuit.

BRIEF DESCRIPTION OF THE DRAWINGS

The foregoing, as well as other objects, features and advantages of the invention will be more readily understood upon reading the following detailed description of the illustrated embodiment, together with reference to the accompanying drawing, which is a circuit schematic, partially in block form, of a radio transceiver wherein an exemplary circiut embodying of the invention has been employed.

DETAILED DESCRIPTION OF THE ILLUSTRATED EMBODIMENT

Referring now to the drawing, a conventional radio transceiver apparatus is illustrated, partially in block diagrammatic form. The radio transceiver includes a conventional receiver circuit, designated generally by the reference numeral 10. Conventionally, the receiver circuit 10 includes a high frequency amplifier (HF AMP) 12, a local oscillator (LOCAL OSC) 14, an intermediate frequency amplifier (IF AMP) 16, and a detector 18.

The transmitter portion of the circuit includes a conventional oscillator circuit (OSC) 20 and a modulator and power amplifier circuit 22. An antenna 24 serves for both receiving and transmitting purposes and hence is coupled both to the high frequency amplifier 12 of the receiver circuit 10 and to the modulator and power amplifier circuit 22 of the transmitter circuit. Additionally, a conventional microphone 26 is provided for transmitting while a conventional speaker (not shown) is provided for reproducing the received audio signals.

A conventional audio or voice amplifying circuit is also provided and designated generally by the reference numeral 30. This audio amplifier circuit 30 includes a preamplifier comprising transistors 32 and 34 and related passive components and a class B, push-pull amplifier comprising transistors 36 and 38 and related passive components. Briefly, the output of the preamplifier circuit at the collector electrode of the transistor 34 is applied to the amplifier circuit by way of a conventional transformer 40, while the amplified output of the amplifier circuit is applied to the speaker through a conventional output transformer 42.

The receiver circuit 10 includes a conventional squelch circuit in the intermediate frequency amplifier 16 which provides a squelch signal to a line 44. Briefly, this squelch circuit operates in well-known fashion by detecting the level of noise present at the intermediate frequency amplifier circuit 16. When no carrier wave or signal is present, the squelch circuit responds to a preselected, ambient noise level by producing a preselected level of output or "squelch" signal. However, when a carrier wave or signal is present in the intermediate frequency amplifier circuit 16, the squelch circuit produces a substantially zero level output signal.

Also in accordance with conventional practice, the detector circuit 18 includes an automatic gain control (AGC) circuit whose output is fed to the stages of the high frequency and intermediate frequency amplifiers 12 and 16 by way of a line 45. Briefly, this AGC signal is generally inversely proportional to the strength of the received carrier wave for causing the amplification applied thereto in the high frequency amp and intermediate frequency amp 12 and 16 to likewise vary inversely with the strength of the incoming carrier wave. Consequently, and also in accordance with conventional practice, the resulting audio frequency signal produced at the output of the detector is held to a substantially constant level by this AGC circuit. This results in a substantially constant level audio signal input to the preamplifier and amplifier circuits and hence a substantially constant sonic level, for a given volume setting, at the speaker, regardless of the relative strength of the incoming radio signal.

As discussed briefly above, the class B push-pull amplifier, and specifically the transistors 36 and 38, generally draws a current of on the order of 5 to 10 mA even when no audio signal is present, in order to prevent crossover distortion. Similarly, the transistors 32 and 34 of the preamplifier circuit generally draw between 5 and 7 mA under this no signal condition. Departing from convention, therefore, the present invention provides a novel switching circuit for switching off the power supply to the amplifier and preamplifier circuits during periods when no radio signal is being received.

Referring now to the drawing, in the illustrated embodiment, this switching circuit comprises a pair of DC-switching NPN transistors 46 and 48 and a power source switching PNP transistor 50. The first DC-switching transistor 46 receives the squelch signal at its base electrode by way of a suitable level adjusting variable resistor 52. The collector electrode of this transistor 46 is coupled with the cathode of a diode 54, the anode of which is coupled with the base electrode of the transistor 48. Similarly, the collector electrode of the transistor 48 is coupled with the base electrode of the power switching PNP transistor 50 by way of a resistor 56. This resistor 56 is in turn series coupled with a resistor 58 which is coupled between the base and emitter electrodes of the transistor 50. The emitter electrode of the transistor 50 receives the B+ supply. Hence, the resistor 56 and 58 provide a current path from the B+ supply to the base electrode of the transistor 50 at their junction, and thence to the collector electrode of the transistor 48. The collector electrode of the transistor 46 as well as the base electrode of the transistor 48 both receive the B+ power supply by way of suitable current limiting resistors 57, 59. In accordance with the invention, therefore, the B+ voltage is selectively applied to the preamplifier transistors 32 and 34, as well as to the amplifier transistors 36 and 38 through the emitter-collector path of the switching transistor 50.

When no radio or carrier signal is present at the intermediate frequency amplifier 16 of the receiver 10, an adjustable level squelch signal is applied to the base of the transistor 46, in accordance with the setting of the variable resistor 52. This adjusted signal provides a source of base current to the transistor 46, switching this transistor 46 to its "on" state. Accordingly, the transistor 46 draws collector current by way of the diode 54 and thereby removes base current from the transistor 48, whereby the transistor 48 is switched to its "off" state. With the transistor 48 in the "off" state no current flows through resistors 56 and 58 and hence no base current is provided to transistor 50, whereby the transistor 50 is switched to its "off" state.

Consequently, the transistor 50 effectively switches off the B+ power supply from the preamplifier transistors 32 and 34 and from the amplifier transistors 36 and 38, substantially eliminating the current flow from the B+ supply to amplifier and preamplifier circuits when no radio or carrier signal is present. Advantageously, in the case of a portable unit, wherein a battery is utilized as the B+ supply, this arrangement substantially reduces the power consumption from the battery. In this regard, it will be appreciated that the current drain through the current limiting resistors 57, 59 and DC switching transistor 46, when in the "on" state, is negligible.

Conversely, when a detectable carrier signal is present in the IF AMP 16, the squelch circuit produces a substantially zero level squelch signal, thus providing no base current to the transistor 46 by way of the variable resistor 52. Hence, the transistor 46 is effectively switched off. With the transistor 46 in its "off" state, base current from the B+ power supply to the transistor 48 is allowed to flow, causing the transistor 48 to switch to its "on" state. With the transistor 48 in the "on" state current is drawn through resistors 56 and 58, thereby providing base current at the transistor 50. Consequently, this power switching transistor 50 is switched to its "on" state, effectively coupling the B+ power supply with the transistors 32 and 34 of the preamplifier and with the transistors 36 and 38 of the amplifier.

More specifically, and with reference to the drawing, it will be seen that the collector electrode of the transistor 50 is coupled by way of a resistor 60 to the center tap of the secondary coil of the transformer 40. This secondary coil in turn provides base current to transistors 36 and 38 of the push-pull amplifier circuit. Similarly, a resistor 62 couples the collector electrode of the transistor 50 with a first resistor 64 which is in series with the base electrode of the transistor 34 and with a resistor 66 which is in series with the collector electrode of the transistor 32. Hence, it will be seen that the switching on and off of the transistor 50 effectively either provides or removes the B+ power supply from the base electrodes of transistors 34, 36 and 38 and from the collector electrode of the transistor 32.

Additionally, a suitable voltage divider circuit comprising a pair of series-connected resistors 68 and 70 runs between the collector electrode of the transistor 46 and ground, the midpoint thereof feeding the base electrode of the transistor 32 of the preamplifier circuit. This latter circuit is for noise suppression during the switching of the transistors 46, 48 and 50.

In accordance with another aspect of the invention the AGC signal from the detector circuit 18 is also fed on the line 45 to the base electrode of the first switching transistor 46. Consequently, this AGC signal may be used as an auxiliary control signal, complementing the squelch signal fed to the variable resistor 52. In this regard, when the received radio or carrier signal level is quite small, a relatively large AGC signal will be produced, assuring that the transistor 46 is turned on, which it will be remembered results in the turning off of the power switching transistor 50. In some instances, it may be desirable to remove the B+ power from the amplifier circuits in this fashion, when the incoming signal is at a very low level. In all other cases the circuit will operate substantially in response to the squelch signal as described above.

What has been illustrated and described hereinabove is a novel switching circuit for minimizing the power consumption of a portable, battery-operated radio receiver. While the invention has been shown and described with reference to a preferred embodiment, the invention is not limited thereto. On the contrary, the invention includes such changes, alternatives and modifications as may occur to those skilled in the art upon reading the foregoing descriptions, insofar as such changes, alternatives and modifications fall within the spirit and scope of the appended claims.

The invention is claimed as follows:

1. In a radio receiver having a power supply, squelch circuit means, an AGC circuit and audio amplifier circuit means, the improvement comprising: switching circuit means interposed between said power supply and said audio amplifier circuit means and responsive to said squelch circuit means for substantially cutting off said power supply from said audio amplifier circuit means when said squelch circuit is actuated in response to a predetermined noise level in the signal received by said receiver; wherein said switching means includes a first switching element interposed between said power supply and said audio amplifier circuit means and having a control terminal, a second switching element coupled to said control terminal of said first switching element and having a control terminal, and a third switching element coupled to said control terminal of said second switching element and having a control terminal coupled to said squelch circuit means and wherein said third switching element is further directly responsive to said AGC circuit for substantially cutting off said power supply from said audio amplifier circuit means when said AGC circuit is responding to a predetermined level of audio signal present in a signal received by said receiver.

2. The improvement according to claim 1 wherein said audio amplifier circuit means includes a preamplifier circuit and wherein said first switching element is further interposed between said power supply and said preamplifier circuit and responsive to said squelch circuit means for substantially cutting off said power supply from said preamplifier circuit when said squelch circuit means is actuated in response to a predetermined noise level in the received signal.

3. The improvement according to claim 1 wherein said first switching element comprises a PNP transistor having an emitter electrode coupled with said power supply and a collector electrode coupled with said audio amplifier circuit means and a base electrode comprising said control terminal thereof, wherein said second switching element comprises an NPN transistor having a collector electrode coupled to the base electrode of said PNP transistor, an emitter electrode coupled to ground and a base electrode comprising said control terminal thereof, and wherein said third switching element comprises a second NPN transistor having a collector electrode coupled to the base electrode of said first NPN transistor, an emitter electrode coupled with ground and a base electrode comprising said control terminal thereof and coupled with said squelch circuit means.

4. The improvement according to claim 3 and further including means providing a current path between said power supply and both the collector electrode of said first NPN transistor and the base electrode of said PNP transistor.

5. The improvement according to claim 3 or claim 4 and further including a potentiometer coupled to said squelch circuit means and to said base electrode of said second NPN transistor to deliver an adjustable signal level from said squelch circuit means to said base electrode.

6. In a radio receiver having a power supply, squelch circuit means, and audio amplifier circuit means, the improvement comprising: switching circuit means interposed between said power supply and said audio amplifier circuit means and responsive to said squelch circuit means for substantially cutting off said power supply from said audio amplifier circuit means when said squelch circuit is actuated in response to a predetermined noise level in the signal received by said receiver; wherein said switching means includes a first switching element interposed between said power supply and said audio amplifier circuit means and having a control terminal, a second switching element coupled to said control terminal of said first switching element and having a control terminal, and a third switching element coupled to said control terminal of said second switching element and having a control terminal coupled to said squelch circuit means; and wherein said first switching element comprises a PNP transistor having an emitter electrode coupled with said power supply and a collector electrode coupled with said audio amplifier circuit means and a base electrode comprising said control terminal thereof, wherein said second switching element comprises an NPN transistor having a collector electrode coupled to the base electrode of said PNP transistor, an emitter electrode coupled to ground and a base electrode comprising said control terminal thereof, and wherein said third switching element comprises a second NPN transistor having a collector electrode coupled to the base electrode of said first NPN transistor, an emitter electrode coupled with ground and a base electrode comprising said control terminal thereof and coupled with said squelch circuit means.

7. In a radio receiver having a power supply, a squelch circuit, an AGC circuit and audio amplifier circuit means, the improvement comprising: a switching circuit interposed between said power supply and said audio amplifier circuit means and including a control input, said switching circuit being responsive to said control input for substantially cutting off said power supply from said audio amplifier circuit means when said control input receives a signal at a predetermined level, circuit means intermediate said control input and said squelch circuit for producing said signal of predetermined level in response to said squelch circuit when said squelch circuit is responding to a predetermined noise level present in the signal received by said radio receiver, and wherein said control input is further coupled to said AGC circuit and said switching means is responsive to said AGC circuit for cutting off said power supply from said audio amplifier means when said AGC circuit is responding to a predetermined low level audio signal present in a radio wave received by said receiver.

8. The improvement according to claim 7 wherein said amplifier circuit means includes a preamplifier circuit and wherein said switching circuit is further interposed between said power supply and said preamplifier circuit and responsive to said control input means for substantially cutting off said power supply from said preamplifier circuit when said signal of predetermined level is present at said control input.

9. The improvement according to claim 7 or claim 8 wherein said switching circuit includes a first switching element interposed between said power supply and said audio amplifier circuit means and having a control terminal, a second switching element coupled to said control terminal of said first switching element and having a control terminal and a third switching element coupled to said control terminal of said second switching element and having a control terminal comprising and control input circuit.

10. The improvement according to claim 9 wherein said first switching element comprises a PNP transistor having an emitter electrode coupled with said power supply and a collector electrode coupled with said audio amplifier circuit means and a base electrode comprising said control terminal thereof, wherein said second switching element comprises an NPN transistor having a collector electrode coupled to the base terminal of said PNP transistor, an emitter electrode coupled to ground and a base electrode comprising said control terminal thereof, and wherein said third switching element comprises an NPN transistor having a collector electrode coupled to the base electrode of said first NPN transistor, an emitter electrode coupled with ground and a base electrode comprising said control terminal thereof.

11. The improvement according to claim 10 and further including means providing a current path between said power supply and both the collector electrode of said first NPN transistor and the base electrode of said PNP transistor.

12. The improvement according to claim 10 wherein said intermediate circuit means comprises a potentiometer coupled to said squelch circuit and to said base electrode of said second NPN transistor to deliver an adjustable signal level from said squelch circuit to said base electrode.

13. The improvement according to claim 10 wherein said control terminal of said third switching element is further coupled to said AGC circuit.

* * * * *